United States Patent [19]

Yamamoto et al.

[11] Patent Number: 5,307,740
[45] Date of Patent: May 3, 1994

[54] MARKING APPARATUS FOR CONTACT LENS

[75] Inventors: Yasuyoshi Yamamoto; Chikai Kosaka; Kazuya Miyamura, all of Gifu, Japan

[73] Assignee: Menicon Co., Ltd., Aichi, Japan

[21] Appl. No.: 57,835

[22] Filed: May 7, 1993

[30] Foreign Application Priority Data

May 8, 1992 [JP] Japan .................. 4-143499

[51] Int. Cl.$^5$ .............................. B05D 1/32
[52] U.S. Cl. ..................... 101/44; 101/126; 101/407.1; 118/301
[58] Field of Search ............. 101/35, 41, 44, 114, 101/115, 126, 129, 407.1, 474; 118/301, 406; 427/164, 282; 8/507

[56] References Cited

U.S. PATENT DOCUMENTS

| | | | |
|---|---|---|---|
| 3,854,398 | 12/1974 | Martin | 101/126 |
| 4,269,874 | 5/1981 | Pryor et al. | 118/301 |
| 4,457,761 | 7/1984 | Sliger | 8/507 |
| 4,478,142 | 10/1984 | Santorineos | 101/126 |
| 4,696,228 | 9/1987 | David et al. | 101/126 |
| 4,872,405 | 10/1989 | Sterman | 101/44 |

FOREIGN PATENT DOCUMENTS

| | | |
|---|---|---|
| 2357151 | 6/1976 | France . |
| 53-40542 | 4/1978 | Japan . |
| 62-35093 | 7/1987 | Japan . |
| 2130507 | 11/1983 | United Kingdom . |

Primary Examiner—Edgar S. Burr
Assistant Examiner—Stephen R. Funk
Attorney, Agent, or Firm—Sughrue, Mion, Zinn, Macpeak & Seas

[57] ABSTRACT

A marking apparatus for providing desired marks such as characters, symbols, graphics, etc. on surfaces of contact lenses in a standardized manner. The marking apparatus includes a main shaft rotatable about an axis and a screen support mounted on the main shaft so as to be rotated therewith. The screen support has a plurality of marking holes provided at equal intervals around a circumference thereof and a screen is stretched across the support. The screen includes patterns associated with the desired mark which are provided in correspondence with the marking holes. A bracket is mounted on the main shaft under the screen support so as to be rotated with the main shaft. A plurality of supporters are supported by the bracket and function to individually support lens beds on which the lenses are respectively disposed. The supporters are movable up and down between a position where the respective contact lenses mounted on the lens beds are brought into contact with corresponding patterns of the screen and a displaced position where the contact lenses can be mounted on or removed from the supporters. Finally, an injector placed above the screen support applies a print solution to the screen stretched in the corresponding one of the marking holes of the screen support.

12 Claims, 3 Drawing Sheets

MARKING APPARATUS FOR CONTACT LENS

BACKGROUND OF THE INVENTION

1. Field of the Invention

The present invention relates to a marking apparatus for forming desired marks such as characters, symbols, graphics, etc. on surfaces of contact lenses and particularly relates to an apparatus for marking contact lenses through screen-transfer of a predetermined print solution.

2. Background

Conventional methods for marking contact lenses include radiating a laser beam onto a contact lens in order to etch a mark in the lens, and radiating an ultraviolet-ray beam onto the contact lens after applying a dye solution to the lens to thereby adhere the dye solution to the contact lens. Since it is not practical to mark contact lens manually, various marking apparatuses have been devised.

For example, Japanese Patent Unexamined Publication No. Sho-53-40542 discloses a marking method comprising the steps of absorbing into a relief layer a solution containing diazonium salt (or a solution containing azo-coloring agent); bringing the relief layer into contact with a contact lens for a predetermined period of time to allow the solution to infiltrate and become dispersed in the contact lens; immersing the lens in a solution containing azo-coloring agent (or a solution containing diazonium salt) for a predetermined period to undergo a coupling reaction to thereby deposit a mark on the contact lens. Additionally, this publication discloses an apparatus which comprises a means for supporting a contact lens, and a collision/contact means including a movable collision/contact arm for supporting the relief layer in order to bring the relief layer into contact with a desired position of the contact lens and hold the lens in a contact state for a predetermined time.

Further, Japanese Patent Unexamined Publication (OPI) No. Sho-62-35093 discloses an apparatus which comprises a means for retaining a contact lens in a marking position, and cartridge means for supporting a film carrying a marking dye. In this apparatus, the cartridge means is fitted onto a platform provided with the lens holding means so that the film is pressed by the contact lens with a predetermined force. The contact state between the film and the contact lens is maintained for a predetermined time to thereby allow the dye to infiltrate into the contact lens. After the dye is transferred to the contact lens, the cartridge means is removed and a developing solution is applied to the lens to perform development of the mark.

In each of these marking apparatuses, however, the working efficiency is low because the process must be stopped while fixing the positions of the lens supporting means and the collision/contact means or the cartridge means in order to hold the contact lens and the film in a contact state until the dye solution or the like has sufficiently infiltrated into the contact lens.

SUMMARY OF THE INVENTION

The present invention has been attained in view of the above problems and an object of the present invention is to provide a contact lens marking apparatus in which the marking process can be standardized so that marking mistakes can be reduced and overall marking efficiency improved.

To solve the above-mentioned problems, the gist of the present invention lies in a marking apparatus for marking contact lenses, comprising (a) a main shaft rotatable about an axis, (b) a screen support mounted on the main shaft so as to be rotated integral with the main shaft, the screen support including a plurality of marking holes provided on the circumference of one and the same circle with the main shaft as its center so as to be disposed at circumferentially equal intervals, the screen support being provided with a screen stretched thereon and having patterns provided correspondingly to the marking holes in accordance with a desired mark, (c) a bracket mounted on the main shaft under the screen support so as to be rotated integrally with the main shaft, (d) lens beds for mounting respective contact lenses to be subjected to marking, (e) a plurality of supporters for supporting the lens beds while being supported by the bracket so as to be movable up and down between a position where each of surfaces of the respective contact lenses mounted on the lens beds is brought into contact with the lower surface of the screen stretched in corresponding one of the marking holes of the screen support and a position where the contact lens can be mounted or removed, and (f) a separate injector placed above the screen support for applying a predetermined print solution on the screen stretched in the corresponding one of the marking holes of the screen support.

In the above-mentioned marking apparatus, preferably, each of the supporters is provided with an adjusting mechanism which can adjust a pressing force when the surface of the corresponding contact lens to be subjected to marking is brought into contact with the screen stretched in the corresponding marking hole of the screen support.

Further, in the above-mentioned marking apparatus, a plurality of contact lens supporters are successively subjected to positional adjustment with respect to a fixed position of a separate injector, so that a print solution can be continuously applied to a plurality of contact lenses through a screen by the injector. Accordingly, the marking operation can be performed continuously while the print solution infiltrates into the lenses. That is, the print solution applied to the first contact lens can sufficiently infiltrate into the lens while the print solution is applied to the last contact lens. Further, upon receiving the print solution applied, each of the contact lenses is revolved in an orbital manner in accordance with the rotation of the main shaft while being kept in contact with the screen before the lens returns to its original position. Accordingly, the operator can replace the contact lens with a new one whenever the print solution is infiltrated into the contact lens, so that continuous marking can be performed with excellent working efficiency. Further, in this apparatus, screen marking is carried out so that clear, sharp marks are formed on the lenses because the marks can be efficiently transferred to the lenses.

In the above-mentioned marking apparatus, the characteristic that not only contact lenses can be mounted/removed easily but the contact lenses can be brought into contact with the screen easily is attained by moving up and down each of the supporters between a position where the lens is brought into contact with the screen and a position where the lens is mounted/removed. Further, each of the supporters can be easily moved with the screen in accordance with the rotation of the main shaft so that the position of the supporter can be adjusted to the position of the separate injector. After the print solution is applied to the screen, the supporter can be moved while the contact lenses and the screen are kept in a contact state stably. Accordingly, mistakes can be prevented because the operation is standardized.

Further, in the above-mentioned marking apparatus, preferably, each of the supporters is provided with an adjusting mechanism which can adjust a pressing force when the surface of the corresponding contact lens to be subjected to marking is brought into contact with the screen of the screen support. Accordingly, in the case where the pressing force is insufficient or excessive, the contact lens and the screen can be kept in contact stably by adjusting the pressing force through manipulation of the adjusting mechanism. Also, in the case where the screen has expanded gradually because of multiple marking operations, the contact lenses and the screen can be maintained in stable contact with each other by increasing the pressing force through manipulation of the adjusting mechanism so that the spreading of the mark can be avoided.

To facilitate a better understanding of the present invention, an embodiment of a contact lens marking apparatus will be described below in detail with reference to the drawings.

BRIEF DESCRIPTION OF THE DRAWINGS

The above and other objects, features and advantages of the invention will be apparent from the following description taken in conjunction with the accompanying drawings, in which.

DETAILED DESCRIPTION OF THE PREFERRED EMBODIMENT

Figure 1:
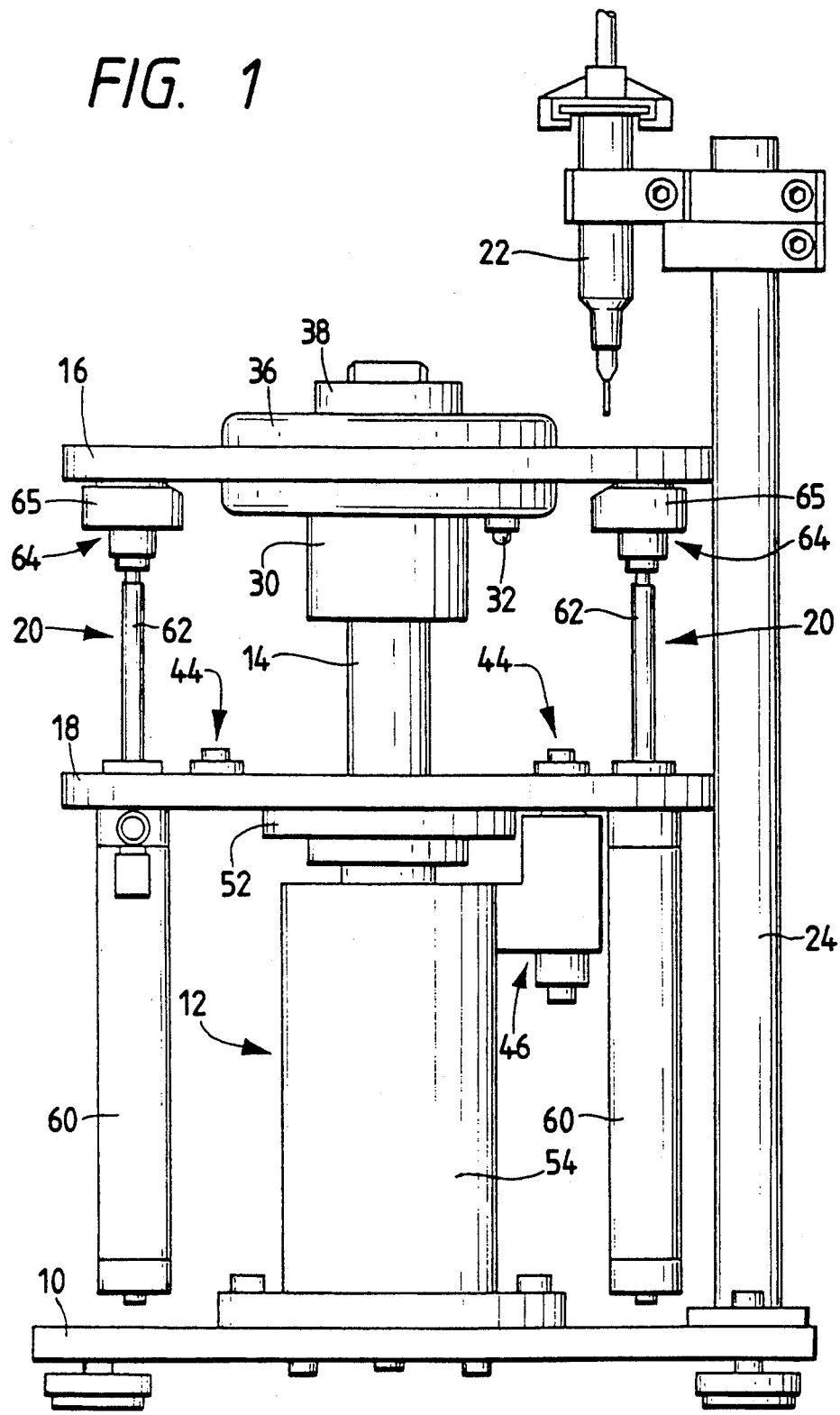
FIG. 1 is a front view schematically showing an example of a contact lens marking apparatus according to the present invention.
Figure 2:
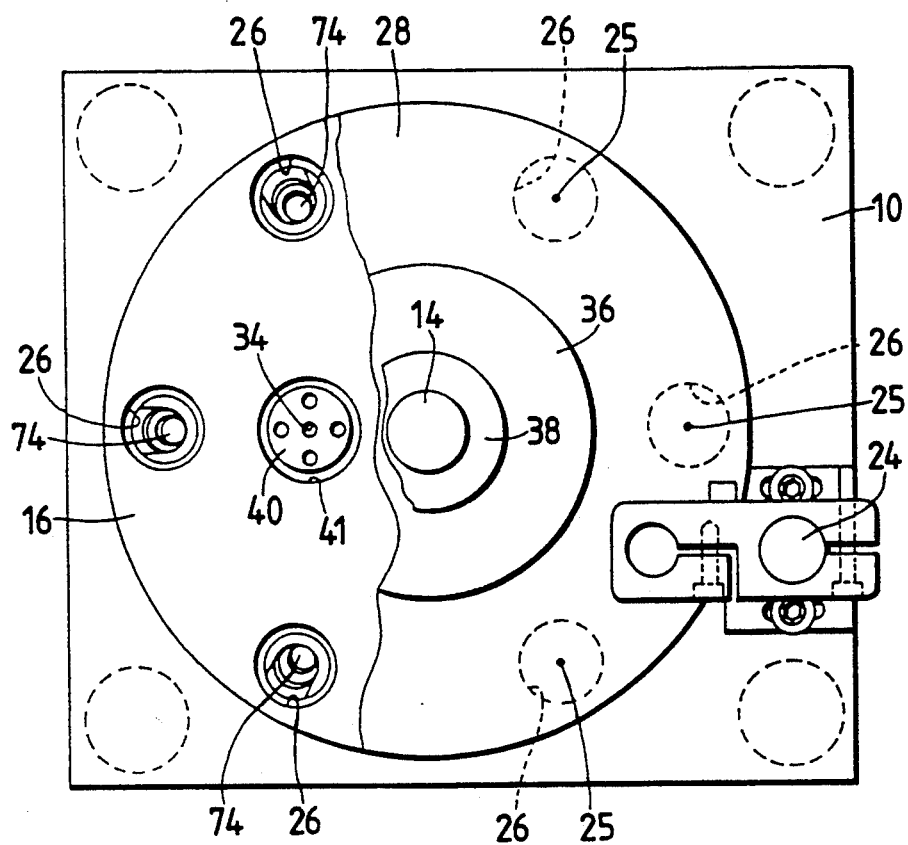
FIG. 2 is a partly cutaway plan view showing the apparatus of FIG. 1.

A preferred embodiment of the present invention will be described with reference to the drawings. FIG. 1 is a schematical illustration of the contact lens marking apparatus according to the present invention and FIG. 2 is a plan view of the apparatus. The marking apparatus includes six supporters 20, only two of which are shown in FIG. 1.

In the drawing, the reference numeral 10 designates a base. A rotation mechanism portion 12 is provided substantially in the center of the base 10 with a vertically disposed main shaft 14 rotatably supported thereby. A disk-like screen support 16 is mounted at the upper end of the main shaft 14 and a disk-like bracket 18 is mounted under the screen support 16, so that the screen support 16 and the bracket 18 are integral to the main shaft 14 and rotatable therewith.

An injector 22 is supported by a stand 24 above the screen support 16 allowing a predetermined amount of the print solution to be ejected downwardly from the injector by means of air pressure or the like.

The screen support 16 has six marking holes 26 formed at equal intervals around the circumference thereof with the main shaft 14 as its center. Further, a screen 28, such as a silk screen, is stretched across the entire top surface of the screen support 16 to thereby cover the marking holes 26. Patterns 25, corresponding to desired marks such as characters, symbols, graphics, etc., are provided on the silk screen at positions corresponding to the center of each of the marking holes 26, as specifically illustrated in FIG. 2.

Figure 3:
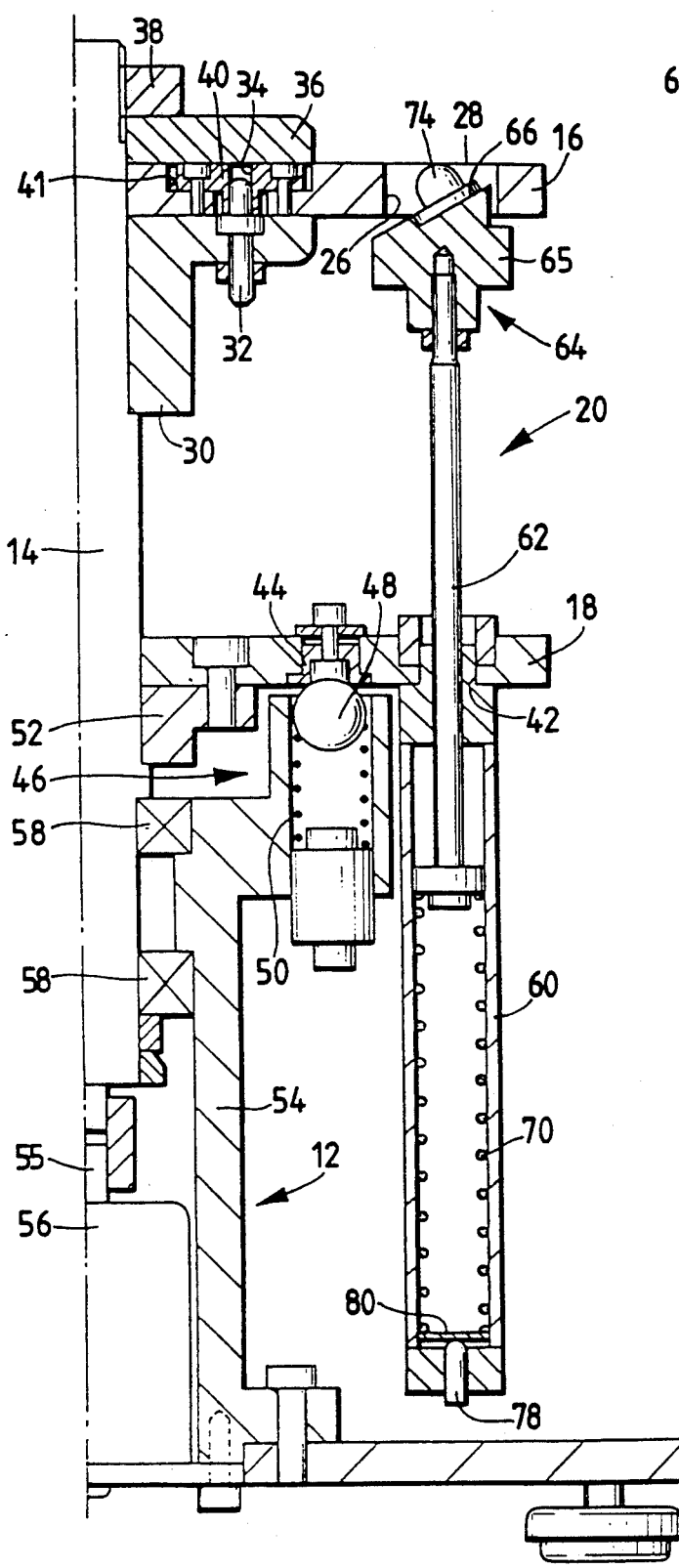
FIG. 3 is an enlarged sectional half-cutaway view showing one of the supporters in the apparatus of FIG. 1.

Further, as shown in FIGS. 2 and 3, the screen support 16 is sandwiched between a lower flange 30, which is fixed to the main shaft 14, and an upper flange 36 by means of a nut 38 threadedly engaged with the main shaft 14. In order to angularly position the screen support with respect to the main shaft 14, an angle correction fitting 40 having a positioning hole 34 is provided in a mount hole 41 formed in the screen support 16. The relative angular position of the main shaft 14 and the screen support 16 is fixed by positioning the screen support so that a positioning pin 32, extending upwardly from the lower flange 30, is engaged in the positioning hole 34 of the angle correction fitting 40. In this manner, each of the patterns 25 on the screen 28 will be successively vertically aligned with the separate injector 22 when the main shaft 14 is successively rotated by an angle of 60°.

The mount hole 41 formed in the screen support 16 is a size larger than the angle correction fitting 40 so that there is a clearance therebetween. Therefore, if the patterns 25 are slightly offset circumferentially from their proper position when the screen 28 is stretched on the screen support 16, the offset can be corrected when mounting the screen support 16 to the main shaft 14. Specifically, after the pin 32 is engaged in the hole 34 of the angle correction fitting 40, the screen support 16 can be slightly rotated due to the clearance of the correction fitting in the mount hole 41 allowing the patterns 25 on the screen 28 to be properly positioned under the separate injector 22 upon successive rotation of the main shaft 14.

FIG. 3 also illustrates the mechanism for holding the contact lenses. Provided below the screen support 16, is a bottom flange 52 which is fixed to the main shaft 14. A bracket 18 is fixed to the top surface of the bottom flange, as illustrated, so that the bracket 18 is rotated with the screen support 16 by the rotation of the main shaft 14. Further, six mount holes 42 are formed in the bracket 18 so as to be respectively vertically aligned with the marking holes 26 of the screen support 16. In this manner, the contact lenses can be brought into contact with the screen 28 through the respective marking holes 26 of the screen support 16 when supporters 20, discussed below, for supporting the contact lenses are mounted in the mount holes 42.

Each of the supporters 20 includes a cylinder 60 including an upper end portion which is inserted upwardly into a corresponding mount hole 42 of the bracket 18, a shaft 62 vertically movable in the cylinder 60, and a stepped cylinder-shaped lens bed support portion 64 mounted on the upper end portion of the shaft 62. The shaft 62 and the lens bed support portion 64 are urged upwardly by a spring 70 provided in the cylinder 60 so that a contact lens supported on the support portion 64 is urged in contact with the lower surface of the screen 28. On the other hand, the shaft 62 can be moved downwardly manually so that the contact lens is disengaged from the screen and the lens can be removed. The support portion 64 includes a stepped portion 65 extending radially therefrom which is larger in diameter than a corresponding marking hole 26 of the screen support 16. As a result, if the support portion 64 is urged upwardly more than a predetermined amount, the stepped portion 65 will abut against the bottom of the screen support 16 to thereby prevent the supporter 20 from damaging the screen 28.

Figure 4:
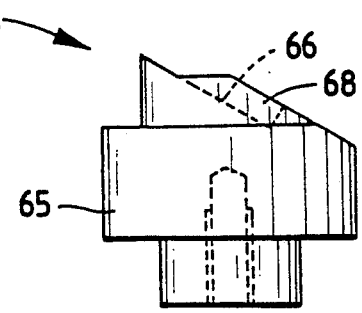
FIG. 4 is a side view showing a lens bed support portion in the apparatus of FIG. 1.
Figure 5:
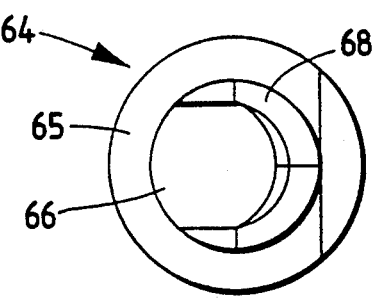
FIG. 5 is a plan view showing the lens bed support portion of FIG. 4.
Figure 6:
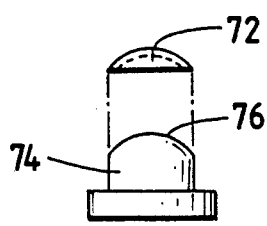
FIG. 6 is an explanatory view showing the front state of a contact lens and a lens bed to be mounted on the lens bed support portion of FIG. 4.

As shown in FIGS. 4 and 5, the lens bed support portion 64 is provided with a 30°-inclined lens bed mount surface 66 and a U-shaped slide wall 68 partially surrounding the lens bed mount surface 66. Referring to FIG. 6, in operation, a contact lens 72, to be subjected to marking, is first set on a curved spherical surface 76 of a lens bed 74 made from acrylic resin or the like. Thereafter, the lens bed 74 is placed on the inclined lens bed mount surface 66 of the lens bed support portion 64 so that it rests against the slide wall 68. Accordingly, the contact lens 72 is supported while being inclined at an angle of 30°. Therefore, a mark portion, located on the periphery of the lens, faces upwardly so that it can be brought into contact with the lower surface of the screen 28 of the screen support 16.

The contact lens 72, supported by the above-mentioned supporter 20, is brought into contact with the screen 28 by a predetermined pressing force based on the urging force of the spring 70. As the pressing force decreases, the contact area between the contact lens 72 and the screen 28 decreases tending to cause the print solution to spread during the marking procedure resulting in a mark that is not sharply defined. Further, even in the case where the pressing force is optimum at the initial stage of use, there is a tendency of the screen 28 to expand due to repetitive use. As a result, the contact area between the contact lens 72 and the screen 28 may decrease gradually, so that there arises the same problem as described above.

Therefore, in this embodiment, an adjusting screw 78 is provided in the lower end portion of the cylinder 60 of the supporter 20 to thereby adjust the position of a backing plate 80 which supports the spring 70 to thereby adjust the pressing force. Accordingly, in the above-mentioned marking apparatus, the contact state between the contact lens 72 and the screen 28 can be appropriately adjusted by manipulating the adjusting screw 78. As a result, not only can lenses be marked clearly for a long term but the life of the screen support 16 and screen 28 can be prolonged.

The marking apparatus further includes a retaining mechanism for retaining each of the supporters 20 at a position directly below the injector. Referring again to FIG. 3, a dividing bushing 44 is provided radially inwardly of each of the mount holes 42 of the bracket 18 and a dividing mechanism body 46, integrated with a housing 54, is provided near the top of the rotation mechanism 12 in correspondence with the position of the separate injector 22. The dividing mechanism 46 includes a ball 48 which is urged by a spring 50 so as to successively engage the dividing bushes 44 when the main shaft 14 is rotated. In this manner, the contact lenses 72, supported by the supporters 20, and the patterns 25, arranged in the marking holes 26 of the screen support 16, can be successively positioned in alignment with the separate injector 22 and temporarily retained in that position.

The main shaft 14 is rotatably supported by the rotation mechanism 12 via bearings 58. Disposed at the bottom end of the main shaft 14 is a motor 56 with a rotation shaft 55 interconnecting the motor to the main shaft 14. As a result, the main shaft 14 can be rotated automatically by the motor. If the motor 56 is of the type in which the degree of rotation can be controlled, the above-mentioned dividing mechanism can be omitted.

An example of a specific marking procedure carried out by using the above-mentioned contact lens marking apparatus will be described below.

1) First, a contact lens is mounted on a support portion 64 of, for example, the supporter 20 immediately preceding the separate injector 22 by an angle of 60° by moving the corresponding shaft 62 downwardly. In this downwardly displaced position, the lens bed 74 including the contact lens 72 embedded thereon is mounted on the lens bed mount surface 66.

2) Then, the supporter 20 is released so that the portion of the lens to be marked faces upwardly and is brought into contact with the pattern 25 of the screen 28 placed in the corresponding marking hole 26 of the screen support 16.

3) Thereafter, the main shaft 14 is rotated 60° to thereby feed the supporter 20 to the right so that the pattern 25 of the screen 28 is positioned below the separate injector 22 at which time the print solution is applied.

4) When the first supporter 20 is returned to the original rotation position after steps 1-3 have been performed, the lens bed 74 including the contact lens 72 which has been marked is removed and another lens bed 74 including a new contact lens 72 is mounted. Since the solution remains in contact with each of the contact lenses over an angular range of 300°, there is sufficient time for the mark to be formed in the lens. This process is performed for each of the supporters 20 so that a contact lens is being continuously mounted and removed for each 60° of rotation of the main shaft.

Alternatively, the contact lens 72 may be removed from the supporter 20 in an arbitrary time sequence before the supporter 20 makes a complete revolution, if the print solution can be sufficiently infiltrated into the mark point in the shorter time period.

As described above, by using the marking apparatus of the present invention, marking can be performed efficiently utilizing a standardized operation so that a desired mark can be formed on the contact lens 72. Further, even in the case where the screen 28 has expanded because of repetitive use, the contact lens 72 and the screen 28 can be kept in stable contact with each other by simply adjusting the pressure adjusting mechanism 78, 80. Accordingly, not only can a clear mark be formed on each of the lenses, but the life of the screen 28 and the screen support 16 can be prolonged.

Having described in detail a typical embodiment of the present invention, it is a matter of course that the present invention is not at all limited by the above description of the preferred embodiment. It is understood that various changes, modifications, improvements, etc. may be made on the basis of knowledge of those skilled in the art without departing from the spirit and scope of the present invention.

For example, although the above embodiment relates to the case where the bracket 18 is shaped like a disk having the mount holes 42 provided on the circumference of a circle so as to correspond in number to the marking holes 26 of the screen support 16, it is a matter of course that the bracket 18 may be alternatively constituted by a plurality of arm-like members each having one or a plural number of mount holes 42. Further, the structure of the supporter 20 is not at all limited by the above description. For example, urging means such as the spring 70 and the like are not always required as long as the contact lens 72 and the screen 28 can be kept in a contact state on the basis of a predetermined pressing force by vertically moving the contact lens 72. Further, the shaft 62 and the lens bed support portion 64 may be provided in the form of an integrated body, and alternatively, the lens beds 74 may be provided in the form of an integrated body. Further, the inclination angle of the lens bed mount surface 66 of the lens bed support portion 64 of the supporter 20 may be altered depending on the location of the mark portion of the contact lens 72.

Alternatively, in this marking apparatus, the main shaft 14 may be rotated to thereby automatically move one of the supporters 20 downwardly to a lens removal position. Further, the main shaft 14 may be rotated to automatically apply an optimum quantity of the print solution from the separate injector 22 onto one of the supporters 20.

What is claimed is:

1. A marking apparatus for marking contact lenses with a desired mark, comprising:
   a housing:
   a main shaft rotatably disposed in said housing;
   a screen support mounted on said main shaft so as to be rotated therewith, said screen support having a plurality of marking holes provided at equal intervals around a circumference thereof;
   a screen stretched across said support and including patterns provided in correspondence with said marking holes, said patterns being associated with said desired mark;
   a plurality of support members corresponding in number to said plurality of marking holes for respectively supporting said contact lenses;
   means for respectively urging said support members, and attendantly said contact lenses, against said patterns of said screen with a predetermined urging force and for displacing said support members from said screen to allow said contact lenses to be mounted on or removed from said support members; and
   applying means for applying a print solution to said screen in correspondence, with said patterns by successively rotating said main shaft by an angle corresponding to said interval.

2. The marking apparatus of claim 1, wherein said urging means comprises:
   a plurality of vertically disposed cylinders corresponding in number to said plurality of support members and disposed below said screen support, each of said cylinders including:
   a shaft slidably disposed in said cylinder and supporting one of said support members at an upper end of said shaft; and
   spring means provided in said cylinder for urging said shaft, and attendantly said one support member, upwardly against said screen.

3. The marking apparatus of claim 2, wherein said urging means further comprises a bracket secured to said main shaft and rotatable therewith, said bracket having a plurality of through holes therein for respectively receiving said cylinders.

4. The marking apparatus of claim 2, wherein said spring means includes a spring, one end of which contacts said shaft.

5. The marking apparatus of claim 4, further comprising adjusting means for adjusting the magnitude of said urging force applied by said spring to said one support member via said shaft.

6. The marking apparatus of claim 5, wherein said adjusting means includes a backing plate disposed in said cylinder against which an opposite end of said spring abuts and means for axially moving said backing plate wherein said cylinder.

7. The marking apparatus of claim 1, wherein said support members each include a support portion having an inclined surface, a support bed having a spherical surface for receiving a contact lens and means for supporting said support bed on said inclined surface such that an area of said lens to be marked faces directly upwardly.

8. The marking apparatus of claim 1, further comprising locking means for respectively locking said screen support at predetermined angular positions whereat said support members are respectively aligned with said marking holes.

9. The marking apparatus of claim 8, wherein said locking means includes:
   a bracket fixed to said main shaft and rotatable therewith, said blanket having a plurality of bushings holes therein corresponding in number to said plurality of marking holes;
   a ball; and
   means for urging said ball against said bracket such that when said main shaft is rotated to respectively align one of said bushing holes with said ball, said ball is urged into engagement with said one bushing hole to lock said screen support at a predetermined position.

10. The marking apparatus of claim 1, further comprising adjusting means for adjusting the magnitude of said urging force.

11. A marking apparatus for contact lens comprising:
   a main shaft rotatable about an axis;
   a screen shaft mounted on said main shaft so as to be rotated therewith, said screen support having a plurality of marking holes provided at equal intervals around a circumference thereof;
   a screen stretched across said support and including patterns provided in correspondence with said marking holes, said patterns being associated with a desired mark;
   a bracket mounted on said main shaft under said screen support so as to be rotated with said main shaft;
   lens beds for mounting respective contact lenses to be subjected to marking;
   a plurality of supporters for individually supporting said lens beds while being supported by said bracket, means for moving said plurality of supporters up and down between a position where the respective contact lenses mounted on said lens beds are brought into contact with corresponding patterns of said screen and a displaced position where the contact lens can be mounted on or removed from said supporters; and a separate injector placed above said screen support for applying a print solution to said screen stretched in said corresponding one of said marking holes of said screen support.

12. A marking apparatus for contact lens according to claim 11, wherein each of said supporters includes an adjusting mechanism for adjusting a pressing force of the corresponding contact lens to be subjected to marking against said screen stretched in the corresponding marking hole of said screen support.

* * * * *